United States Patent [19]

Suzuki et al.

[11] Patent Number: 4,606,953

[45] Date of Patent: Aug. 19, 1986

[54] POLYPROPYLENE COATED STEEL PIPE

[75] Inventors: Kazuyuki Suzuki; Masami Ishida; Fuyuhiko Ohtsuki, all of Kimitsu; Yoshihiro Inuizawa; Saburo Hinenoya, both of Sakai; Mansei Tanaka; Yoshio Shindou, both of Kimitsu, all of Japan

[73] Assignee: Nippon Steel Corporation, Tokyo, Japan

[21] Appl. No.: 621,097

[22] Filed: Jun. 15, 1984

[30] Foreign Application Priority Data

Jun. 23, 1983 [JP] Japan .................................. 58-111884
May 22, 1984 [JP] Japan .................................. 59-101727

[51] Int. Cl.$^4$ .............................................. F16L 9/14
[52] U.S. Cl. ...................................... 428/36; 428/418; 428/461; 138/143; 138/146
[58] Field of Search ............... 428/36, 418, 461; 138/141, 145, 146, 143

[56] References Cited

U.S. PATENT DOCUMENTS

| Re. 31,354 | 8/1983 | Eckner ........................ 138/145 |
| T473,015 | 8/1978 | Chadwick et al. ............... 138/145 |
| 3,877,490 | 4/1975 | Tsubouchi et al. .............. 138/141 |
| 4,091,134 | 5/1978 | Uemura et al. ................. 138/145 |
| 4,142,555 | 3/1979 | Satake et al. .................. 138/145 |
| 4,213,486 | 7/1980 | Samour et al. ................. 138/145 |

FOREIGN PATENT DOCUMENTS 0029661 2/1983 Japan ................................ 138/146

OTHER PUBLICATIONS

*Internal & External Protection of Pipes,* BHRA Fluid Engineering, Sep. 15-17, 1981, pp. 307-316.

*Primary Examiner*—John E. Kittle
*Assistant Examiner*—James J. Seidleck
*Attorney, Agent, or Firm*—Kenyon & Kenyon

[57] ABSTRACT

A polypropylene coated steel pipe comprising a steel pipe, an adhesive layer coated on the external surface of the steel pipe, which has been subjected to a pretreatment, and a polypropylene layer coated on the adhesive layer. The outermost polypropylene layer comprises, as a main constituent, a crystalline ethylene-propylene block copolymer and the adhesive layer comprises a modified polyolefin adhesive.

15 Claims, 6 Drawing Figures

4,606,953

POLYPROPYLENE COATED STEEL PIPE

BACKGROUND OF THE INVENTION

1. Field of the Invention

The present invention relates to a plastic externally coated steel pipe which can be used at a wide temperature range of from −30° C. to 120° C.

2. Description of the Prior Art

Polyethylene coated steel pipes are now widely used as a plastic externally coated steel pipe. Since polyethylene is inexpensive, is chemically stable, and has excellent mechanical properties (impact resistance, flexibility, etc.), polyethylene is considered an excellent material for coating a steel pipe. However, since polyethylene has a low softening point, it is generally considered to be unsuitable for use at temperatures exceeding 80° C. Recently, the high pressure operation of pipelines and the transportation of heavy crude oil have created a demand for a plastic coated steel pipe which will withstand higher temperatures, and which can be substituted for conventional polyethylene coated steel pipes. Also, in sub-temperature zones, laying operations are carried out even at temperatures around −30° C. Accordingly, it is essential that the plastic coated steel pipes should also have an excellent impact resistance and flexibility at such low temperatures.

Since polypropylene has a higher softening temperature than polyethylene and is chemically stable, it is expected as a coating material which can be utilized for coated steel pipes used at a high temperature. Conventional polypropylene is, however, inferior to polyethylene in mechanical properties at a low temperature, and its application to steel pipes is very limited.

The present inventors have already discovered that polypropylene consisting of a block copolymer of propylene and ethylene, in which the ethylene content is adjusted to an adequate range, exhibits improved mechanical properties at a low temperature while a high softening temperature is retained (See: Tsuchiya et al: Papers presented at the 4th International Conference on the Internal and External Protection of Pipes, p 307, 1981). The present inventors have made further investigations into the application of such a polypropylene to a steel pipe. As a result, the present inventors have discovered that an excellent adhesive strength is attained in the coated steel pipe only when a modified polyolefin adhesive is used and that, when an impact according to a procedure described in ASTM G14 is applied to the coating layer of a coated steel pipe obtained through the use of a conventional modified polyolefin adhesive, cracks are generated in the coating layer at a temperature of −20° C. or less, and thus the impact resistance at −30° C. required in a sub-temperature zone cannot be attained. Furthermore, it was discovered that, even if a pretreatment is applied to the steel pipe to form a conventional epoxy primer layer thereon, when a cathode potential is applied to the steel pipe for the purpose of preventing electrical corrosion, the disbondment (or delamination) of the coating layer (hereinafter abbreviated as "cathodic disbondment") becomes gradually more conspicuous with each increase in temperature.

Furthermore, even when polypropylene coated pipes are used at high temperatures under the ground, through-flaws sometimes occur due to the penetrating action of the surrounding gravel. Accordingly, the depth of penetration at high temperatures is preferably as little as possible. However, plastic coated steel pipes satisfying the above-mentioned requirements have not been developed.

SUMMARY OF THE INVENTION

Accordingly, the objects of the present invention are to eliminate the above-mentioned problems of the prior art and to provide a polypropylene coated steel pipe which is capable of being used at a wide range of temperatures.

Other objects and advantages of the present invention will be apparent from the following description.

In accordance with the present invention, there is provided a polypropylene coated steel pipe comprising a steel pipe, an adhesive layer coated on the external surface of the steel pipe, which has been subjected to a pretreatment, and a polypropylene layer coated on the adhesive layer, wherein the outermost polypropylene layer comprises, as a main constituent, a crystalline ethylene-propylene block copolymer and the adhesion layer comprises a modified polyolefin adhesive.

BRIEF DESCRIPTION OF THE DRAWINGS

The present invention will be better understood from the description set forth below with reference to the drawings, in which.

DESCRIPTION OF THE PREFERRED EMBODIMENTS

In order to overcome the above-mentioned difficulties, the present inventors carried out various studies of the coating material, the adhesive, and the pretreatment method using, for example, a primer. As a result, the present invention provides a plastic externally coated steel pipe which can be used at a wide temperature range of from approximately −30° C. to 120° C.

Figure 1:
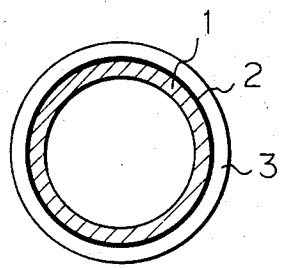
FIG. 1 is a cross sectional view of a polypropylene coated steel pipe according to the present invention.
Figure 2:
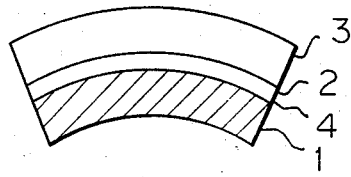
FIG. 2 is a partial cross sectional view of a polypropylene coated steel pipe in which an epoxy primer layer having a glass transition temperature of 80° C. or more is formed between the steel pipe and the adhesive layer.
Figure 3:
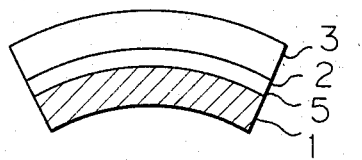
FIG. 3 is a partial cross sectional view of a polypropylene coated steel pipe in which a chromate chemical conversion treatment is applied to the external surface of the pipe.
Figure 4:
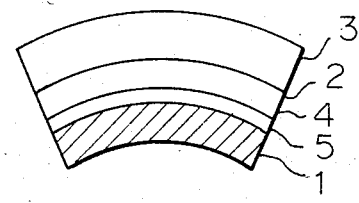
FIG. 4 is a partial cross sectional view of a polypropylene coated steel pipe in which a chromate chemical conversion treatment is applied to the external surface of the pipe, followed by the formation of an epoxy primer layer having a glass transition temperature of 80° C. or more.

That is, the preferred embodiments of the present invention comprise:

(1) A polypropylene coated steel pipe comprising a steel pipe 1, an adhesive layer 2 coated on the external surface of the steel pipe, which has been pretreated, and a polypropylene layer 3 coated on the adhesive layer 2, as shown in FIG. 1; wherein a resin comprising, as a main constituent, a crystalline ethylene-propylene block copolymer, and having a brittleness temperature of 15° C. or less is used as the polypropylene, and a modified polyolefin adhesive having a brittleness temperature of −20° C. or less is used as the adhesive;

(2) A polypropylene coated steel pipe comprising a steel pipe 1, an adhesive layer 2 coated on the external surface of the steel pipe, which has been pretreated, and a polypropylene coating layer 3 on the adhesive layer 2, as shown in FIG. 1; wherein a resin comprising, as a main constituent, a crystalline ethylene-propylene block copolymer, and having a brittleness temperature of 0° C. or less and a penetration depth at 120° C. of 0.3 mm or less is used as the polypropylene; and a modified polyolefin adhesive having a brittleness temperature of −20° C. or less is used as the adhesive;

(3) A polypropylene coated steel pipe as mentioned in item (1) above, wherein after the external surface of the steel pipe is subjected to a mechanical pretreatment such as a blasting treatment to clean the surface, an epoxy primer layer 4 having a glass transition temperature of 80° C. or more is formed between the steel pipe 1 and the adhesive layer 2, as shown in FIG. 2;

(4) A polypropylene coated steel pipe as mentioned in item (1) above, wherein after the external surface of the steel pipe is subjected to a mechanical pretreatment such as a blasting treatment to clean the surface, a chemical treatment such as a chromate type chemical conversion treatment 5 is applied between the steel pipe 1 and the adhesive layer 2, as shown in FIG. 3;

(5) A polypropylene coated steel pipe as mentioned in item (1) above, wherein after the external surface of the steel pipe is subjected to a mechanical pretreatment such as a blasting treatment to clean the surface, a chromate type chemical conversion treatment 5 is applied between the steel pipe 1 and the adhesive layer 2, followed by the formation of a primer layer such as an epoxy primer layer 4 having a glass transition temperature of 80° C. or more on the chemical conversion treatment layer; and (6) A polypropylene coated steel pipe as mentioned in item (1) above, wherein the modified polyolefin adhesive is a mixture of an unsaturated carboxylic acid modified crystalline polypropylene, an unmodified crystalline polypropylene, and a polyolefin rubber.

Note, the brittleness temperature is a value determined according to ASTM Specification D746 by using a specimen having a thickness of 2 mm and a notch having a depth of 0.1 mm in the width direction on the impact surface.

The materials for the polypropylene coating layer 3 usable in the present invention are polypropylenes comprising, as a main constituent, crystalline ethylene-propylene block copolymers, and having a brittleness temperature of 15° C. or less and a penetration depth at 120° C. of preferably 0.3 mm or less, more preferably 0.25 mm or less. As the polypropylene there may be used, in addition to crystalline block copolymers of propylene and ethylene, mixtures of the above-mentioned copolymers with polyethylene having a density of 0.93 g/cm$^3$ or more (including an ethylene homopolymer and ethylene-α-olefin copolymers of ethylene and up to about 15% by weight of an α-olefin such as propylene, butene-1, pentene, hexene, heptene and octene), polyolefin rubbers (ethylene-propylene copolymer rubbers, ethylene-propylene-non-conjugated diene terpolymer rubbers, ethylene-propylene-butene-1 terpolymer rubbers, polyisobutylene, 1,2-polybutadiene), and/or ethylene-vinyl acetate copolymer rubbers. Among these, polypropylenes comprising (A) 95% to 55% by weight of a polypropylene component insoluble in p-xylene at ambient temperature, (B) 2% to 40% by weight of a polyethylene component insoluble in p-xylene at ambient temperature, and (C) 3% to 20% by weight of a fraction soluble in p-xylene at ambient temperature, which are obtained by the multistage polymerization of propylene and ethylene or by carefully kneading a block copolymer of propylene and ethylene with polyethylene and/or a polyolefin rubber in a kneading machine such as FCM, are preferable.

It is preferable that these polypropylenes have a melt flow rate (MFR) of 0.05 to 5 g/10 min. Preferably, these polypropylene may optionally contain additives such as antioxidants, ultraviolet light absorbers, and pigments.

When the brittleness temperature of the polypropylene coating layer 3 is higher than 15° C., the desired impact resistance at −30° C. is not likely to be obtained.

The materials for the adhesive layer 2 usable in the present invention include modified polyolefin adhesives having a brittleness temperature of −20° C. or less. Specifically, modified polyolefin adhesives preferably comprise (i) 60% to 95% by weight of unsaturated carboxylic acid modified crystalline polypropylene (D) and unmodified crystalline polypropylene(E) and (ii) 5% to 40% by weight of polyolefin rubbers (F).

The above-mentioned unsaturated carboxylic acid-modified crystalline polypropylene can be obtained by the heating reaction, known per se, of crystalline polypropylene and unsaturated carboxylic acid compounds such as maleic anhydride in the presence of a radical reaction initiator, for example, by the melt reaction of crystalline polypropylene and unsaturated carboxylic acid compounds in the presence of a radical reaction initiator.

The crystalline polypropylenes include crystalline propylene homopolymers, crystalline block copolymers of ethylene and propylene, or crystalline random copolymers of ethylene, propylene and/or other α-olefins (e.g., butene, hexene, octene, etc.). It is preferable that the crystalline polypropylenes preferably have a melt flow rate (MFR) of 0.1 to 20 g/10 min, more preferably 0.2 to 10 g/10 min.

As the unsaturated carboxylic acid compounds, there are used known unsaturated carboxylic acids or anhydrides thereof. Examples of such compounds are maleic acid, maleic anhydride, acrylic acid, methacrylic acid, citraconic acid, citraconic anhydride, itaconic acid and itaconic anhydride. An especially preferable compound is maleic anhydride. The graft ratio of the unsaturated carboxylic acid or the anhydride thereof to be grafted onto the crystalline polypropylene is preferably in the range of from $1\times10^{-7}$ to $1\times10^{-3}$ moles per 1 g of the crystalline polypropylene, more preferably $1\times10^{-6}$ to $5\times10^{-4}$ moles per 1 g of the crystalline polypropylene.

The above-mentioned unmodified crystalline polypropylenes include crystalline homopolymers of propylene, crystalline block copolymers of ethylene and propylene, crystalline random copolymers of ethylene and propylene or crystalline random terpolymers of ethylene, propylene, and other α-olefins (e.g., butene, hexene, octene), or the above-mentioned crystalline polypropylenes substituted by up to 30% by weight of polyethylenes (e.g., high density polyethylene, medium density polyethylene, low density polyethylene, or linear low density polyethylene). The preferable unmodified crystalline polypropylenes are those having an MFR of 0.1 to 50 g/10 mm.

The polyolefin rubbers include ethylene-propylene copolymer rubbers, ethylene-propylene-non-conjugated-diene terpolymer rubbers, ethylene-propylene-butene-1 terpolymer rubbers, polyisobutylene, and 1,2-polybutadiene. Among these, ethylene-propylene copolymer rubbers or ethylene-propylene-non-conjugated-diene terpolymer rubbers are preferable. Polyolefin rubbers in which a part is substituted with a rubber such as styrene-butadiene copolymer rubbers, butadiene-styrene-acrylonitrile copolymer rubbers, cis-1,4-polybutadiene, natural rubbers, polyurethane rubbers, and ethylene-vinyl acetate copolymer rubbers may be used as the polyolefin rubber.

The modified polyolefin adhesives usable in the present invention can be obtained by mixing the above-mentioned components in a manner known per se.

The materials for the epoxy primer layer 4 usable in the present invention include paints comprising an epoxy resin consisting essentially of a bisphenol A type epoxy resin having an epoxy equivalent of 170 to 3000, an amine curing agent capable of reacting with and curing the epoxy resin at ambient temperature, and a pigment consisting mainly of an inorganic pigment.

Other types of epoxy resins to be added to the bisphenol A type epoxy resin include, for example, a hydrogenated bisphenol A type epoxy resin, a brominated bisphenol A type epoxy resin, a novolak type epoxy resin, a urethane modified epoxy resin, a resorcinglycidyl ether epoxy resin, a glycidyl ester type epoxy resin, a cycloaliphatic type epoxy resin. Preferably, the amount of epoxy resin added should be 0 to 50 parts by weight, more preferably 5 to 15 by weight, per 100 parts by weight of the bisphenol A type epoxy resin. Among various additional epoxy resins, the addition of a novolak type epoxy resin in an amount of 5 to 30 parts by weight is especially preferable from the viewpoint of hot water resistance and high temperature cathodic disbondment resistance. Also, the additional epoxy resin is selected to have an epoxy equivalent of 170 to 3000, preferably 190 to 1925, in view of the hot water resistance, high temperature cathodic disbondment resistance, and coating workability.

The amine curing agents include, for example, a heterocyclic modified diamine curing agent, a modified fatty acid polyamine curing agent, a modified aromatic polyamine curing agent, and a modified polyamide amine curing agent. Among these curing agents, a heterocyclic modified diamine curing agent and a modified aromatic polyamine curing agent are especially preferable. The usage ratio of epoxy resin to curing agent is not especially limited but can be determined, as usual, according to the epoxy equivalent of the epoxy resin used.

Preferably, the pigments to be added to the paint include titanium dioxide, mica, barium sulfate, talc, calcium carbonate, clay, strontium chromate, zirconium silicate, iron oxides, carbon black, and silica. These pigments are selected alone or as a mixture of two or more thereof in an amount of 5 to 50 parts by weight, preferably 5 to 25 parts by weight, per 100 parts by weight of the total amount of the epoxy resin and the amine curing agent, in view of the coating workability. A mixture of less than 5 parts by weight of the pigment is ineffective for improving the high temperature cathodic disbondment resistance of the resultant epoxy primer layer.

The materials for the chromate type chemical conversion treatment layer 5, which may be used in the present invention, include an aqueous solution of a compound oxide consisting of chromium (VI) oxide and chromium (III) oxide, which is obtained by partially reducing chromium (VI) oxide, and the above-mentioned aqueous solution containing a reduction promoting agent such as glycerine and polyvinyl alcohol or silica sol for enhancing the adhesion of the chemical conversion treatment layer to the coating layer.

Figure 5:
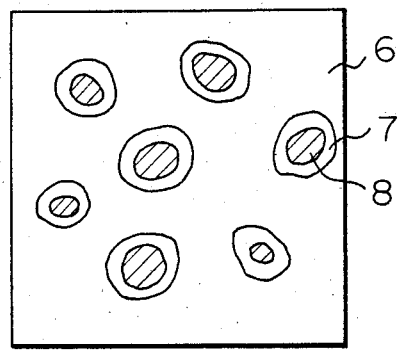
FIG. 5 shows a structure of a polypropylene phase and a polyethylene phase of a crystalline ethylene-propylene block copolymer; and, FIG. 6 shows an appropriate combination of the brittleness temperature of a polypropylene coating layer and the brittleness temperature of an adhesive, which combination is represented by a shaded region.

In the present invention, the polypropylene is limited to one comprising, as a main constituent, a crystalline ethylene-propylene block copolymer, as a conventional crystalline ethylene-propylene random copolymer exhibits low-temperature mechanical properties which are not significantly improved when compared with homopolypropylene, and further, exhibits remarkably reduced high-temperature mechanical properties. In the case of the crystalline ethylene-propylene block copolymer, a polypropylene phase 6 and a polyethylene phase 8, respectively, form an independent region without mutual dissolution and an ethylene-propylene rubber phase 7 is formed between the polypropylene phase 6 and the polyethylene phase 8, as shown in FIG. 5, and thus, excellent impact resistance and low-temperature mechanical properties can be attained without substantial deterioration of the high-temperature mechanical strength. That is, because of the presence of a continuous phase of polypropylene, the melting point and high temperature mechanical properties of the crystalline ethylene-propylene block copolymer are not substantially different from those of propylene homopolymers. On the other hand, the polyethylene phase and the ethylene-propylene rubber phase are present in the form of an island in the polypropylene phase, and such a phase structure absorbs impact energy. Therefore, the crystalline ethylene-propylene block copolymer as a whole has far better impact resistance and low-temperature mechanical properties than the propylene homopolymer. FIG. 5 is a schematic view of a structure of the polypropylene phase, polyethylene phase, and ethylene-propylene rubber phase of the crystalline ethylene-propylene block copolymer.

Figure 6:
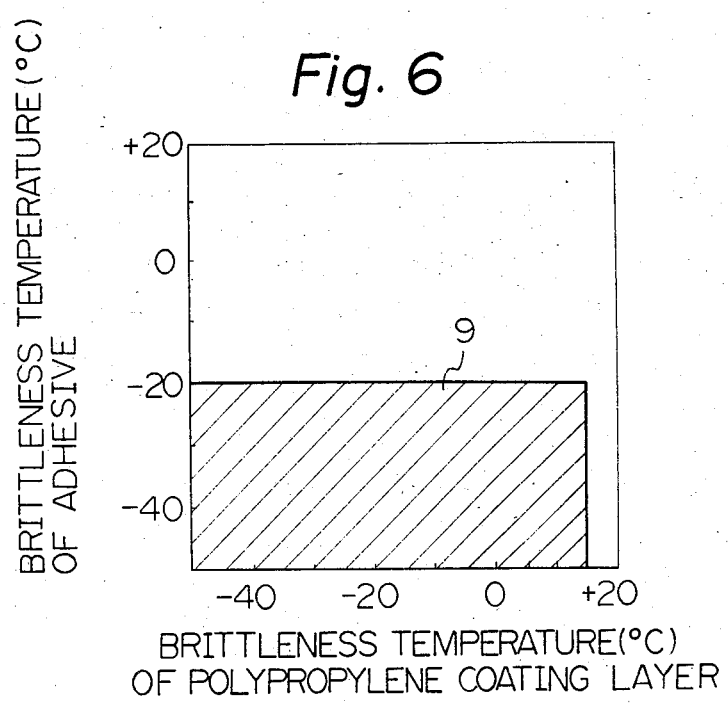

The brittleness temperature of the polypropylene coating layer comprising, as a main constituent, the crystalline ethylene-propylene block copolymer, is limited to 15° C. or less and the brittleness temperature of the adhesive is limited to −20° C. or less, preferably −20° C. or less in the case of the brittleness temperature of the coating layer of 0° C. or less and −30° C. or less in the case of the brittleness temperature of the coating layer between 0° C. and 150° C. As a result of various investigations by the present inventors, it was found that the impact resistance of the polypropylene coated steel pipe is largely influenced by not only the brittleness temperature of the polypropylene coating layer but also the brittleness temperature of the adhesive. Furthermore, an impact test carried out according to ASTM Specification G14 revealed that, to ensure that the lowest temperature at which no cracking is generated in the coating layer is −30° C. or less, the brittleness temperature of the polypropylene coating layer and the adhesive layer should be limited to those defined above-mentioned conditions. That is, if the brittleness temperature of the polypropylene coating layer and the adhesive lie in a region 9, represented by an oblique line in FIG. 6, the polypropylene coated steel pipe undergoes no cracking even at −30° C. when an impact is applied to the coating layer according to ASTM Specification G14. FIG. 6 shows the results of an impact test at −30° C. wherein the shaded portion represents region 9, in which no cracking is generated in the coating layer. In FIG. 6, the abscissa represents the brittleness temperature of the polypropylene coating layer and the ordinate represents the brittleness temperature of the adhesive.

The chromate type chemical conversion treatment layer or the epoxy primer layer, or both, are formed between the steel pipe and the adhesive layer because the chemical conversion treatment layer and the primer layer are remarkably effective for preventing cathodic disbondment, corrosion under the coating, and the penetration of water from the surface of the coating layer into the adhesion interface. If both the chemical conversion treatment layer and the primer layer are formed, a more certain prevention effect is obtained. The glass transition temperature of the epoxy primer layer is limited to 80° C. or more. If the glass transition temperature of the epoxy primer is less than 80° C., the epoxy primer layer will soften at an elevated temperature and will not satisfactorily prevent the cathodic disbondment of the coating layer and corrosion under the coating.

Further, since the brittleness temperature of the crystalline ethylene-propylene block copolymer of the coating layer is 15° C. or less and the brittleness temperature of the adhesive is $-20°$ C. or less, even if the coating layer undergoes a high impact, no cracking is generated in the coating layer even at $-30°$ C. The chromate type chemical conversion treatment layer or the epoxy primer layer having a glass transition temperature of 80° C. or more, or both, can be, optionally, formed between the steel pipe and the adhesive layer. In this case, the coating layer has an excellent durability against cathodic disbondment and corrosion under the coating, especially at an elevated temperature. Since the coating of the polypropylene coated steel pipe according to the present invention exhibits excellent durability and corrosion preventing ability over a wide temperature range, from a high temperature environment as high as 120° C. to a low temperature environment as low as $-30°$ C., it is applicable to such fields as high pressure operation pipelines for natural gas and high temperature transportation pipelines for heavy oil in a sub-temperature zone, where no corrosion preventing effect could be satisfactorily attained by conventional techniques. Therefore, the polypropylene coated steel pipe of the present invention is very significant from an industrial point of view.

EXAMPLES

The present invention will now be illustrated by, but is by no means limited to, the following Examples, wherein the depth of penetration is determined according to a DIN specification 30670 method.

EXAMPLE 1

A steel pipe (JIS specification SGP, 400 A), which had been subjected to a shot blasting treatment, was preheated to a temperature of 180° C. A maleic anhydride-modified polypropylene adhesive having a brittleness temperature of $-30°$ C., a melt flow rate of 2.8 g/10 min, and a density of 0.890 g/cm$^3$, was melt extruded by using a circular die onto the surface of the preheated steel pipe to form an adhesive layer of 200$\mu$ thickness thereon. Immediately thereafter, a crystalline ethylene-propylene block copolymer having a brittleness temperature of $-10°$ C., a penetration depth at 120° C. of 0.27 mm, a melt flow rate of 0.41 g/10 min., a density of 0.921 g/cm$^3$ and a carbon black concentration of 0.5%, and containing an antioxidant and an ultraviolet light absorber, was melt extruded by using a circular die onto the adhesive layer to form a polypropylene coating layer of 3 mm thickness thereon, thereby obtaining a polypropylene coated steel pipe.

The polypropylene coated steel pipe was subjected to a penetration depth determination at a predetermined temperature (according to DIN Spec. 30670), a falling weight test (ASTM Spec. G14), a cathodic disbondment test (ASTM Spec. G8, electric voltage: $-1.5$ V v.s. S.C.E., term: 30 days), and a hot water test. The hot water test was carried out by immersing the sample in hot water at 90° C. for 1000 hours. Thereafter, a 10 mm width of the coating layer was subjected to 90 degree peeling at a peeling rate of 50 mm/min at 23° C. by using an Instron tensile tester to determine the peel adhesive strength. The results of these tests are summarized in Table 1.

EXAMPLE 2

A steel pipe (SGP, 400 A), which had been subjected to a shot blasting treatment, was preheated to a temperature of 210° C. A maleic anhydride-modified polypropylene adhesive in the form of powder and having a brittleness temperature of $-35°$ C., a melt flow rate of 3.9 g/10 min, and a density of 0.888 g/cm$^3$ was coated on the surface of the preheated steel pipe and was melted to form an adhesive layer of 130$\mu$ thickness thereon. Immediately thereafter, a crystalline ethylene-propylene block copolymer having a brittleness temperature of $-13°$ C., a penetration depth at 120° C. of 0.29 mm, a melt flow rate of 0.37 g/10 min, a density of 0.920 g/cm$^3$, a carbon black concentration of 0.5%, and containing an antioxidant and an ultraviolet light absorber, was melt extruded by using a T die onto the adhesive layer of the steel pipe, in such a manner as to be spirally wound round the steel pipe, to form a polypropylene coated steel pipe in which the thickness of the polypropylene coating was 3 mm.

The polypropylene coated steel pipe was subjected to a performance test in the same manner as in Example 1. The results are summarized in Table 1.

EXAMPLE 3

A steel pipe (SGP, 400 A), which had been subjected to a shot blasting treatment, was preheated at a temperature of 210° C. A heat curable epoxy paint (two-pack curing type, a mixture of 100 parts of a bisphenol A type epoxy resin having an epoxy equivalent of 190, 40 parts of a curing agent consisting of an aromatic amine, and 25 parts of a pigment consisting of titanium dioxide) was spray coated onto the surface of the preheated steel pipe. The coated epoxy paint on the steel pipe was cured to form an epoxy primer layer of 30$\mu$ thickness. The cured coating had a glass transition temperature of 94° C. Immediately thereafter, application of an adhesive and a coating of polypropylene were carried out in the same manner as in Example 2. The resultant polypropylene coated steel pipe was subjected to a preformance test. The results are shown in Table 1.

EXAMPLE 4

The surface of a steel pipe (SGP, 400 A), which had been subjected to a shot blasting treatment, was coated with a coating type chromate treating agent to form a chromate coating thereon at a total chromium coverage of 600 mg/m$^2$. Thereafter, preheating, the application of an adhesive, and the coating of polypropylene were carried out in the same manner as in Example 2. The resultant polypropylene coated steel pipe was subjected to a performance test. The results are shown in Table 1.

EXAMPLE 5

The surface of a steel pipe (SGP, 400 A), which had been subjected to a shot blasting treatment, was coated with a coating type chromate treating agent to form a chromate coating thereon at a total chromium coverage of 550 mg/m$^2$. Thereafter, the steel pipe was preheated to a temperature of 210° C. and the same epoxy paint as in Example 3 was spray coated onto the surface of the steel pipe. The coated epoxy paint was cured to form an epoxy primer layer of 30μ thickness. Immediately thereafter, the application of an adhesive and the coating of polypropylene were carried out in the same manner as in Example 2. The resultant polypropylene coated steel pipe was subjected to a performance test. The results are shown in Table 1.

EXAMPLE 6

A steel pipe (SGP, 400 A), which had been subjected to a shot blasting treatment, was preheated to a temperature of 210° C. A heat curable epoxy paint (two-pack curing type, a mixture of 100 parts of a bisphenol A type epoxy resin having an epoxy equivalent of 190, 50 parts of a curing agent consisting of a heterocyclic amine, and 2 parts of a pigment consisting of titanium dioxide) was spray coated onto the surface of the preheated steel pipe. The coated epoxy paint on the steel pipe was cured to form an epoxy primer layer of 30μ thickness. The cured coating had a glass transition temperature of 74° C. Immediately thereafter, the application of an adhesive and the coating of polypropylene were carried out in the same manner as in Example 2. The resultant polypropylene coated steel pipe was subjected to a performance test. The results are shown in Table 1.

EXAMPLE 7

A steel pipe (SGP, 400 A), which had been subjected to a shot blasting treatment, was preheated to a temperature of 210° C. A maleic anhydride-modified polypropylene adhesive in the form of powder and having a brittleness temperature of −58° C., a melt flow rate of 2.0 g/10 min, a density of 0.888 g/cm$^3$, and a maleic anhydride content of $7.0 \times 10^{-6}$ mol/g was coated on the surface of the preheated steel pipe and was melted to form an adhesive layer of 130μ thickness thereon. Immediately thereafter, a crystalline ethylene-propylene block copolymer having a brittleness temperature of 3° C., a penetration depth at 120° C. of 0.19 mm, a melt flow rate of 1.0 g/10 min, a density of 0.920 g/cm$^3$, a carbon black concentration of 0.5%, and an addition amount of a nucleating agent of 0.2%, and containing an antioxidant and an ultraviolet light absorber, was melt extruded by using a T die onto the adhesive layer of the steel pipe, in such a manner as to be spirally wound round the steel pipe, to form a polypropylene coated steel pipe in which the thickness of the polypropylene coating was 3 mm.

The polypropylene coated steel pipe was subjected to a performance test in the same manner as in Example 1. The results are summarized in Table 1.

EXAMPLE 8

A steel pipe (SGP, 400 A), which had been subjected to a shot blasting treatment, was preheated at a temperature of 210° C. A heat curable epoxy paint (two-pack curing type, a mixture of 100 parts of a bisphenol A type epoxy resin having an epoxy equivalent of 190, 40 parts of a curing agent consisting of an aromatic amine, and 25 parts of a pigment consisting of titanium dioxide) was spray coated onto the surface of the preheated steel pipe. The coated epoxy paint on the steel pipe was cured to form an epoxy primer layer of 30μ thickness. The cured coating had a glass transition temperature of 94° C. Immediately thereafter, application of an adhesive and a coating of polypropylene were carried out in the same manner as in Example 2. The resultant polypropylene coated steel pipe was subjected to a preformance test. The results are shown in Table 1.

Comparative Example 1

A steel pipe (SGP, 400 A), which had been subjected to a shot blasting treatment, was preheated to 210° C. A maleic anhydride-modified polypropylene adhesive in the form of powder and having a brittleness temperature of −5° C., a melt flow rate of 4.5 g/10 min, and a density of 0.896 g/cm$^3$ was coated onto the surface of the steel pipe and was melted to form an adhesive layer of 130μ thickness thereon. Immediately thereafter, a polypropylene coating layer was coated in the same manner as in Example 2. The resultant polypropylene coated steel pipe was subjected to a performance test. The results are shown in Table 1.

Comparative Example 2

A steel pipe (SGP, 400 A), which had been subjected to a shot blasting treatment, was preheated to a temperature of 210° C. A maleic anhydride-modified polypropylene adhesive in the form of powder and having a brittleness temperature of +14° C., a melt flow rate of 6.2 g/10 min, and a density of 0.888 g/cm$^3$ was coated onto the surface of the preheated steel pipe and melted to form an adhesive layer of 130μ thickness thereon. Immediately thereafter, a homopolypropylene having a brittleness temperature of 30° C. or more, a penetration depth at 120° C. of 0.10 mm, a melt flow rate of 0.89 g/10 min, a density of 0.918 g/cm$^3$, and a carbon black concentration of 0.5%, and containing an antioxidant and an ultraviolet light absorber was melt extruded using a T die onto the adhesive layer in such a manner as to be spirally wound round the steel pipe to obtain a polypropylene coated steel pipe of 3 mm thickness.

The polypropylene coated steel pipe was subjected to a performance test in the same manner as in Example 1. The results are summarized in Table 1.

TABLE I

| | Result of Performance Test | | | | |
| --- | --- | --- | --- | --- | --- |
| | Penetration depth test (120° C.) (mm) | Falling weight test (the lowest temperature at which no cracking is generated in coating layer) (°C.) | Cathodic disbondment test (80° C.) (mm) | Hot water test (peeling strenth after immersion) (kg/cm) | Remark |
| Example 1 | 0.28 | −34 | 30 or more | 1.1 | Invention |

TABLE I-continued

| | Result of Performance Test | | | | |
|---|---|---|---|---|---|
| | Penetration depth test (120° C.) (mm) | Falling weight test (the lowest temperature at which no cracking is generated in coating layer) (°C.) | Cathodic disbondment test (80° C.) (mm) | Hot water test (peeling strenth after immersion) (kg/cm) | Remark |
| Example 2 | 0.27 | −33 | 30 or more | 1.0 | Invention |
| Example 3 | 0.28 | −36 | 10.2 | 7.1 | Invention |
| Example 4 | 0.27 | −36 | 19.8 | 11.0 | Invention |
| Example 5 | 0.28 | −35 | 8.5 | 13.9 | Invention |
| Example 6 | 0.27 | −36 | 17.2 | 2.4 | Invention |
| Example 7 | 0.19 | −32 | 30 or more | 1.0 | Invention |
| Example 8 | 0.19 | −34 | 8.6 | 16.8 | Invention |
| Comparative 1 Example | 0.28 | −5 | 30 or more | 1.0 | Outside invention |
| Comparative 2 Example | 0.11 | +25 or more | 30 or more | 0.8 | Outside invention |

As is apparent from Table 1, in the polypropylene coated steel pipe according to the present invention, in which the coating layer has a penetration depth at 120° C. of 0.3 mm or less, even if a high impact is applied to the coating layer at a temperature as low as −30° C., no cracking is generated therein, and thus, the coating layer has excellent mechanical properties at a wide temperature range of from −30° C. to 120° C. In addition, as is apparent from the test values of Comparative Examples outside the present invention, which are shown in Table 1, in the case of the coated steel pipe in which the coating layer consists of the homopolypropylene or where the crystalline ethylene-propylene block copolymer is used as the coating layer but the brittleness temperatures of the coating layer and the adhesive layer are outside those described in the scope of claim for patent of the present invention, applying a high impact to the coating layer at a temperature of −30° C. or more results in cracking in the coating layer and thus, such coated steel pipes are useless at −30° C.

Where electric corrosion prevention is applied to the coated steel pipe and where the coated steel pipe is used under a wet environment, the values of the cathodic disbondment test and the hot water test are important. In such cases, the polypropylene coated steel pipe in which the adhesive is directly applied after the completion of the cleaning treatment undergoes large peeling when subjected to the cathodic disbondment test and the adhesive strength of the coating layer is poor after the hot water test, as is indicated in Examples 1 and 2 and in the Comparative Examples. In contrast, the coated steel pipe in which the epoxy primer is applied before coating of the adhesive, as shown in Example 3, and the coated steel pipe in which the chromate type chemical conversion treatment is applied before coating of the adhesive, as shown in Example 4, are remarkably reduced in peeling distance when subjected to the cathodic disbondment test, and the adhesive strength of the coating layers is not substantially decreased after the hot water test. In the case of the coated steel pipe in which both the chromate type chemical conversion treatment and application of the epoxy primer are carried out before coating of the adhesive, these effects are further increased, as shown in Example 5.

Furthermore, in the case of the coated steel pipe in which the epoxy primer is applied, it is apparent from a comparison of Example 3 with Example 6 that the peeling distance in the cathodic disbondment test at 80° C. is smaller, and the adhesive strength of the coating layer after the hot water test at 90° C. is higher, when the epoxy primer has a higher glass transition temperature of the cured coating.

As detailed hereinabove, the present invention makes it possible to obtain a coating layer maintaining a small depth of penetrating at an elevating temperature, while improving an impact resistance at low temperatures by specifying the molecular structure and physical properties of materials used for the polypropylene coating layer and the adhesive layer, and makes it possible to impart excellent cathodic disbondment resistance at elevated temperatures and hot water resistance to the coated steel pipe by forming the chromate type chemical conversion treatment layer or the epoxy primer layer having a high glass transition temperature, or both, between the steel pipe surface and the adhesive layer. Therefore, the present invention is an epochmaking invention which never before produced and, thus, is extremely significant from an industrial point of view.

We claim:

1. A polypropylene coated steel pipe comprising a steel pipe, an adhesive layer coated on the external surface of the steel pipe which has been subjected to a pretreatment, and a polypropylene layer coated on the adhesive layer, the outermost polypropylene layer comprising, as a main constituent, a crystalline ethylene-propylene block copolymer having a brittleness temperature of 15° C. or less and the adhesive layer comprising a mixture of an unsaturated carboxylic acid modified crystalline polypropylene, an unmodified crystalline polypropylene and a polyolefin rubber having a brittleness temperature of −20° C. or less.

2. A polypropylene coated steel pipe as claimed in claim 1, wherein the polypropylene comprising, as a main constituent, a crystalline ethylene-propylene block copolymer has a brittleness temperature of 15° C. or less.

3. A polypropylene coated steel pipe as claimed in claim 1, the depth of penetration of the crystalline ethylene-propylene block copolymer at 120° C. is 0.3 mm or less.

4. A polypropylene coated steel pipe as claimed in claim 1, wherein the external surface of the steel pipe is pretreated by being cleaned by a mechanical pretreatment.

5. A polypropylene coated steel pipe as claimed in claim 4, wherein the mechanical pretreatment is a blasting treatment.

6. A polypropylene coated steel pipe as claimed in claim 1, wherein the external surface of the steel pipe is pretreated by being coated by an epoxy primer having a glass transition temperature of 80° C. or more after the external surface is cleaned by a mechanical pretreatment.

7. A polypropylene coated steel pipe as claimed in claim 6, wherein the mechanical pretreatment is a blasting treatment.

8. A polypropylene coated steel pipe as claimed in claim 1, wherein the external surface of the steel pipe is pretreated by being cleaned by a mechanical pretreatment, followed by a chemical conversion treatment.

9. A polypropylene coated steel pipe as claimed in claim 8, wherein the mechanical pretreatment is a blasting treatment and the chemical conversion treatment is a chromate treatment.

10. A polypropylene coated steel pipe as claimed in claim 1, wherein the external surface of the steel pipe is pretreated by being cleaned by a mechanical pretreatment, being treated by a chemical conversion treatment, and being coated thereon by an epoxy primer having a glass transition temperature of 80° C. or more.

11. A polypropylene coated steel pipe as claimed in claim 10, wherein the mechanical pretreatment is a blasting treatment and the chemical conversion treatment is a chromate treatment.

12. A polypropylene coated steel pipe as claimed in claim 1, wherein the outermost layer comprises:
   (A) 55% to 95% by weight of a crystalline ethylene-propylene block copolymer insoluble in p-xylene at ambient temperature;
   (B) 2% to 40% by weight of polyethylene having a density of 0.93 g/cm$^3$ or more insoluble in p-xylene at ambient temperature; and
   (C) 3% to 20% by weight of a polyolefin rubber soluble in p-xylene at ambient temperature.

13. A polypropylene coated steel pipe as claimed in claim 12, wherein the polyethylene is an ethylene homopolymer or a copolymer of 85% by weight or more of ethylene and 15% by weight or less of an alpha-olefin.

14. A polypropylene coated steel pipe as claimed in claim 13, wherein the alpha-olefin is at least one member selected from the group consisting of propylene, butene-1, pentene, hexene, heptene, and octene.

15. A polypropylene coated steel pipe as claimed in claim 12, wherein the polyolefin rubber is at least one member selected from the group consisting of ethylene-propylene copolymer, rubbers, ethylene-propylene-non-conjugated diene terpolymer rubbers, ethylene-propylene-butene-1 terpolymer rubbers, polyisobutylene rubbers, 1,2-polybutadiene rubbers, and ethylene-vinylacetate copolymer rubbers.

* * * * *

UNITED STATES PATENT AND TRADEMARK OFFICE
CERTIFICATE OF CORRECTION

PATENT NO. : 4,606,953
DATED : August 19, 1986
INVENTOR(S) : K. Suzuki, et al.

It is certified that error appears in the above-identified patent and that said Letters Patent is hereby corrected as shown below:

Column 1, line 6, change "a plastic externally coated" to --an externally plastic-coated--.

Column 1, line 11, change "a plastic externally coated" to --an externally plastic-coated--.

Column 2, line 58, change "a plastic externally coated" to --an externally plastic-coated--.

Column 4, line 14, change "polypropylene" to --polypropylenes--.

Column 5, line 25, after "type epoxy resin," add the word --and-- before "a" at the end of the line.

Column 10, Table I, third line of next to last column of table, change "strenth" to --strength--.

Column 12, Table I, third line of next to last column of table, change "strenth" to --strength--.

UNITED STATES PATENT AND TRADEMARK OFFICE
CERTIFICATE OF CORRECTION

PATENT NO. : 4,606,953

DATED : August 19, 1986

INVENTOR(S) : K. Suzuki, et al.

It is certified that error appears in the above-identified patent and that said Letters Patent is hereby corrected as shown below:

Column 12, line 24, change "penetrating" to --penetration-- and "elevating" to --elevation--.

Column 12, line 25, omit the word "an" before the word "impact".

Column 12, line 36, after "invention" insert a comma and after "produced" insert a comma.

Column 12, line 47, after "acid" insert a comma.

Column 12, line 52, after "comprising" omit the comma.

Column 14, line 7, after "more" insert a comma.

UNITED STATES PATENT AND TRADEMARK OFFICE
CERTIFICATE OF CORRECTION

PATENT NO. : 4,606,953

DATED : August 19, 1986

INVENTOR(S) : Kazuyuki Suzuki et al.

It is certified that error appears in the above-identified patent and that said Letters Patent is hereby corrected as shown below:

Column 14, line 27, change "vinylacetate" to -- vinyl acetate -- .

Signed and Sealed this

Seventeenth Day of March, 1987

Attest:

DONALD J. QUIGG

Attesting Officer     Commissioner of Patents and Trademarks